United States Patent [19]

Morikawa et al.

[11] Patent Number: 4,469,157
[45] Date of Patent: Sep. 4, 1984

[54] PNEUMATIC TIRE

[75] Inventors: Tsuneo Morikawa; Kazuyuki Kabe, both of Hiratsuka, Japan

[73] Assignee: The Yokohama Rubber Co., Ltd., Tokyo, Japan

[21] Appl. No.: 330,824

[22] Filed: Dec. 15, 1981

[30] Foreign Application Priority Data

Dec. 29, 1980 [JP] Japan .................................. 55-188602

[51] Int. Cl.³ ............................ B60C 9/04; B60C 9/20
[52] U.S. Cl. .............................. 152/354 R; 152/356 R; 152/361 R
[58] Field of Search ............ 152/354 R, 354 RB, 355, 152/356 R, 356 A, 357–359, 361 R, 361 FP, 361 DM

[56] References Cited

U.S. PATENT DOCUMENTS

| 1,579,817 | 4/1926 | Keith | 152/356 |
| 2,432,630 | 12/1947 | Purdy | 152/356 |
| 3,126,042 | 3/1964 | Cegnar | 152/361 DM |
| 4,258,774 | 3/1981 | Mirtain et al. | 152/361 FP |
| 4,387,755 | 6/1983 | Kato et al. | 152/356 R |

Primary Examiner—Lois E. Boland
Attorney, Agent, or Firm—Armstrong, Nikaido, Marmelstein & Kubovcik

[57] ABSTRACT

A pneumatic radial tire is disclosed which comprises a tread, a carcass cord layer and at least two belt reinforcing layers disposed between the tread and the carcass cord layer, the reinforcing cord of one of the belt reinforcing layers having an angle of 15 to 30 degrees with respect to the tire circumferential direction and the reinforcing cord of the other of the belt reinforcing layers having an angle of 150 to 165 degrees with respect to the tire circumferential direction. The carcass cord layer consists of upper and lower two layers, and the angle $\alpha_2$ of the reinforcing cord of the upper carcass cord layer with respect to the tire circumferential direction and the angle $\alpha_1$ of the reinforcing cord of the lower carcass cord layer with respect to the tire circumferential direction satisfy the following relations:

$$\tfrac{1}{2}(\alpha_1+\alpha_2)=96° \text{ to } 108° (\alpha_2-\alpha_1)=10° \text{ to } 40°.$$

4 Claims, 12 Drawing Figures

PNEUMATIC TIRE

BACKGROUND OF THE INVENTION

This invention relates to a pneumatic tire, and more particularly, to a pneumatic radial tire of which the ply steer which is generally high in radial tires is reduced and which has improved straight driving characteristics.

Conventional radial car tires generally have a construction in which a belt reinforcing layer consisting of at least two layers is disposed between the tread and the carcass cord layer substantially parallel to the circumferential direction of the tire. The reinforcing cord of one of the layers of the belt reinforcing layers has an angle of 15°–30° with respect to the tire circumferential direction and the other makes an angle of 150°–165° with respect to the tire circumferential direction, these reinforcing cords cross each other, and the carcass cord layer consists of a single or double layer with the cord of each layer being substantially at right angles to the tire circumferential direction. The radial tires of this kind have better braking performance and wear resistance and a lower fuel consumption due to the effects of the belt reinforcing layers, but have a shortcoming in that their straight driving performance is inferior due to the belt reinforcing layers. In other words, there is a lateral force to the right or left with respect to the driving direction when the radial tire rolls forward, even if the slip angle is zero. This lateral force leads the car in a direction different from the direction intended by the driver.

Generally, the lateral force at zero slip angle consists of components of force that are generated by two different mechanisms, one being referrred to as "conicity" (CT) and the other, "ply steer" (PS). They are classified as parts of the uniformity characteristics of the tire. In accordance with the uniformity test method (JASO C607) of car tires, the conicity (CT) and ply steer (PS) can be expressed by the following equations from their definition in conjunction with LFD, LFDw and LFDs, wherein LFD represents the mean value of the lateral force when the tire rotates once, LFDw is the value measured on the outer side and LFDs is the value measured when the tire is turned inside out.

$$LFDw = PS + CT \quad (1)$$

$$LFDs = PS - CT \quad (2)$$

From the above equations (1) and (2), PS and CT can be given as follows:

$$CT = (LFDw - LFDs)/2 \quad (3)$$

$$PS = (LFDw + LFDs)/2 \quad (4)$$

Figure 1:
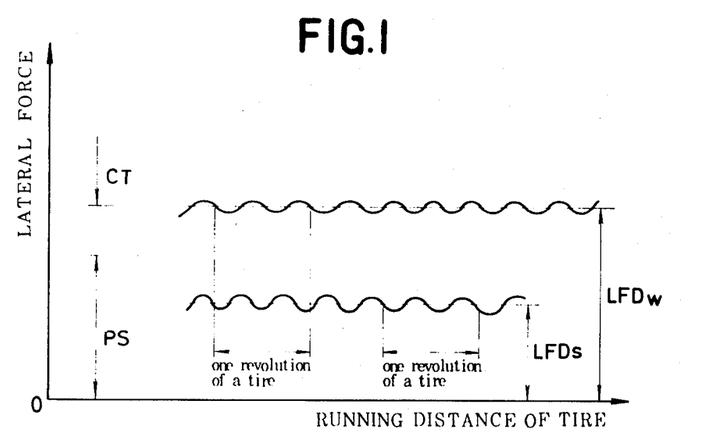
FIG. 1 is a diagram showing the relationship between the running distance of a radial tire and the lateral force.

The relation of these equations (1) through (4) can be expressed as shown in FIG. 1.

The conicity is believed to result from the tire shape being geometrically asymmetric with respect to the center in the circumferential direction of the tire, or is believed to be the force that is generated when the tire, which is in the form like a circular truncated cone, rolls. Since the conicity is affected primarily by the positions of the belt reinforcing layers inserted into the tread of the tire, it can be reduced by any improvements in or relating to the tire production. By contrast, the ply steer is a peculiar force resulting from the structure of the belt reinforcing layers and hence, it has been believed substantially difficult to markedly reduce the ply steer unless the structure of the belt reinforcing layers themselves are changed.

Figure 2:
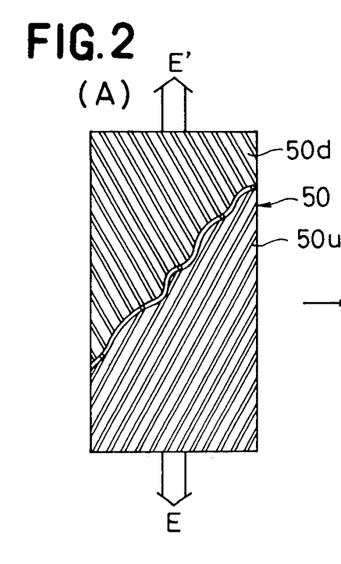

Now, the belt reinforcing layer will be discussed in particular. The belt reinforcing layer can be expressed as a two-layered laminated sheet 50 consisting of belt reinforcing layers 50u and 50d, such as depicted in FIG. 2(A). It is well known that when a tensile force is permitted to act upon this two-layered laminate sheet 50 in the tire circumferential direction EE', the two-layered laminate sheet 50 undergoes deformation not only inside the two-dimensional plane in which the tensile force acts but also three-dimensionally outside the plane, and finally undergoes torsional deformation as depicted in FIG. 2(B). The ply steer results from this torsional deformation of the belt reinforcing layer.

Various attempts have been made in the past to reduce the ply steer by adding a new belt reinforcing layer to the existing belt reinforcing layers, but the addition of a new belt reinforcing layer deteriorates performances of the radial tire such as the low fuel consumption characteristic, increases the tire weight, lowers the efficiency and raises the cost of the tire production; and it is not preferable.

SUMMARY OF THE INVENTION

It is therefore an object of the present invention to provide a pneumatic radial tire having an improved straight driving performance with the ply steer reduced.

It is another object of the invention to provide a pneumatic radial tire which is capable of reducing the ply steer with a minimal number of belt reinforcing layers to improve the straight driving performance of the car without calling for the addition of a new belt reinforcing layer to the existing belt reinforcing layers, by optimizing the angles of disposition of the reinforcing cords in the carcass cord layers.

It is still another object of the invention to provide a pneumatic tire which is capable of improving both maneuvering stability and driving comfort.

The pneumatic tire in accordance with the present invention to accomplish these objects comprises a tread, a carcass cord layer and at least two belt reinforcing layers disposed between the tread and the carcass cord layer, wherein the reinforcing cord of one of the belt reinforcing layers describes an angle of 15 to 30 degrees with respect to the tire circumferential direction while that of the other of the belt reinforcing layers describes an angle of 150 to 165 degrees with respect to the tire circumferential direction; the carcass cord layer consists of upper and lower layers; and the angle $\alpha_2$ of the reinforcing cord of the upper carcass layer with respect to the tire circumferential direction and the angle $\alpha_1$ of the reinforcing cord of the lower carcass cord layer with respect to the tire circumferential direction are such that their average value, that is, $\frac{1}{2}(\alpha_1 + \alpha_2)$, is within the range of 96 to 108 degrees while their difference $(\alpha_2 - \alpha_1)$ is within the range of 10 to 40 degrees, with the proviso that the angles $\alpha_1$ and $\alpha_2$ are measured from the side in which the angle of the reinforcing cord of the belt reinforcing layer adjacent the upper carcass cord layer with respect to the tire circumferential direction describes an acute angle.

These and other objects and advantages of the present invention will be apparent from the following description and the accompanying drawings forming a part thereof.

BRIEF DESCRIPTION OF THE DRAWINGS

FIGS. 2 (A) and 2 (B) are models, each showing a state of deformation of a belt reinforcing layer;

DESCRIPTION OF THE PREFERRED EMBODIMENTS

Figure 3:
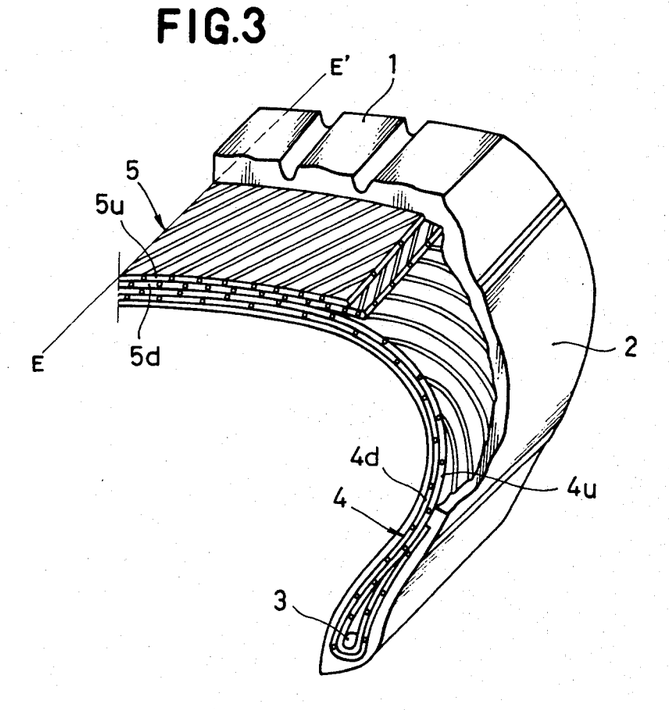
FIG. 3 is a partially sectional perspective view of a pneumatic tire in accordance with an embodiment of the present invention.
Figure 4:
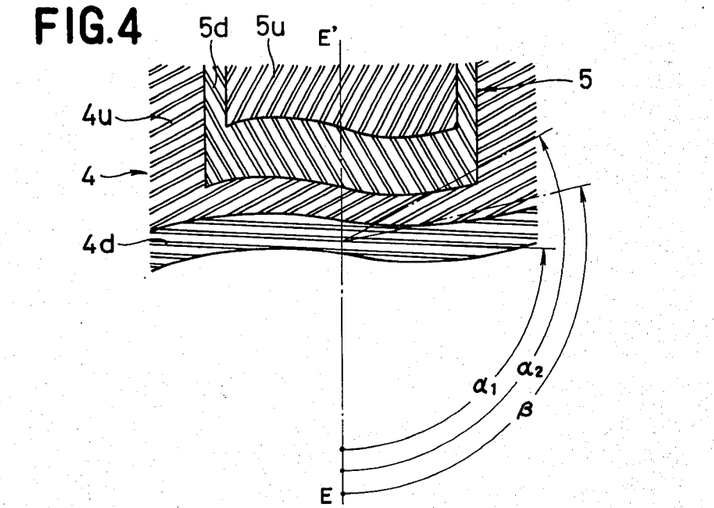
FIG. 4 is an exploded plan view showing some portions of the belt reinforcing layer and the carcass cord layer of the tire of FIG. 3.

In FIGS. 3 and 4, reference numeral 1 represents a tread and reference numeral 2 represents sidewalls that are disposed so as to extend on both sides of the tread 1. The reference numeral 3 represents bead wires embedded to the lower end portions of the sidewalls in the circumferential direction. Carcass cord layers 4 are disposed in such a manner as to wrap the bead wires 3 at both end portions and to extend along the inner surfaces of both sidewalls 2 and tread 1. A belt reinforcing layer 5 consisting of steel cord is interposed between the carcass cord layer 4 and the tread 1. The carcass cord layer 4 has a two-layered laminate structure consisting of an upper carcass cord layer 4u and a lower carcass cord layer 4d and the belt reinforcing layer 5 likewise has a two-layered laminate structure consisting of an upper belt reinfocing layer 5u and a lower belt reinforcing layer 5d.

Of the two layers forming the belt reinforcing layer 5, the upper belt reinforcing layer 5u has an angle of 150 to 165 degrees with respect to the tire circumferential direction EE' of the reinforcing cord and the lower belt reinforcing layer 5d, an angle of 15 to 30 degrees. These upper and lower belt reinforcing layers 5u and 5d are arranged so as to cross each other. The arrangement of the reinforcing cord in the belt reinforcing layer 5 is the same as that in the conventional radial tire.

The angle of the cord forming the carcass cord layer 4 with respect to the tire circumferential direction is one of the important structural factors in order to reduce the ply steer. Accordingly, the cord must be disposed so as to satisfy the following conditions.

Figure 5:
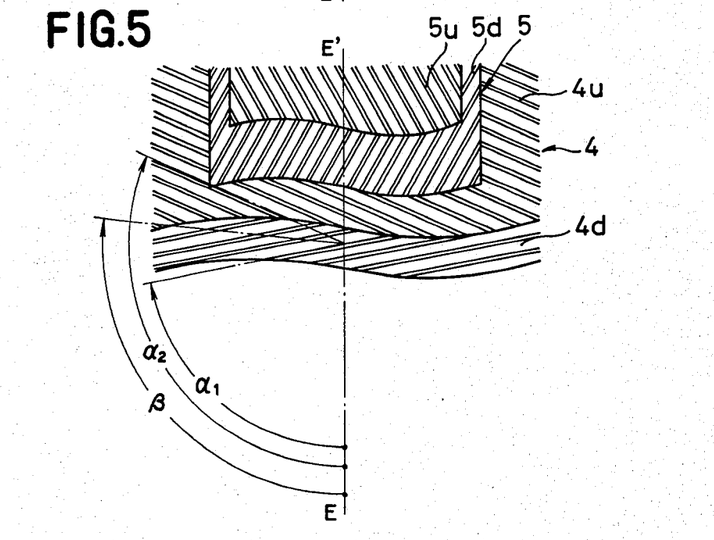
FIG. 5 is an exploded plan view of the belt reinforcing layer and the carcass layer of a pneumatic tire in accordance with another embodiment of the present invention.

Namely, the average angle value $\beta$ of the angle $\alpha_1$ of the reinforcing cord of the lower carcass cord layer 4d and the angle $\alpha_2$ of the reinforcing cord of the upper carcass cord layer 4u, that is to say, $\beta = \frac{1}{2}(\alpha_1 + \alpha_2)$, must be within the range of 96 to 108 degrees and at the same time, the difference between these two angles or $(\alpha_2 - \alpha_1)$ must be within the range of 10 to 40 degrees. In this case, the cord angles of both upper and lower carcass cord layers 4u and 4d of the carcass cord layer 4 are measured from the side in which the reinforcing cord of the lower belt reinforcing layer 5d of the belt reinforcing layers, which is positioned on the contact side with respect to the carcass cord layer 4, describes an acute angle relative to the tire circumferential direction. Since the angles $\alpha_1$ and $\alpha_2$ are measured from the side in which the reinforcing cord of the lower belt reinforcing layer 5d positioned on the contact side with respect to the carcass cord layer 4 describes an acute angle relative to the tire circumferential direction EE', the measurement must be made in the clockwise direction relative to the tire circumferential direction EE' is the reinforcing cord of the lower belt reinforcing layer 5d is disposed leftwardly downward, as depicted in FIG. 5.

As is obvious from the relationship between the angles $\alpha_1$ and $\alpha_2$, the reinforcing cords must be disposed in such a fashion that the angle $\alpha_2$ of the reinforcing cord of the upper carcass cord layer 4u is always greater than the angle $\alpha_1$ of the reinforcing cord of the lower carcass cord layer 4d and they cross each other. If the average value $\beta$ of these angles $\alpha_1$ and $\alpha_2$ is smaller than 96 degrees, the ply steer cannot be improved over the conventional radial tire and if it is greater than 108 degrees, on the other hand, comfort to drive is deteriorated in comparison with the conventional radial tire, though the ply steer can further be improved. Even if the average value $\beta$ of the angles $\alpha_1$ and $\alpha_2$ is within the range of 96 to 108 degrees, however, it is essential in the present invention that the difference $(\alpha_2 - \alpha_1)$ be within the range of 10 to 40 degrees. If the difference $(\alpha_2 - \alpha_1)$ is smaller than 10 degrees, no improvement in the ply steer can be obtained as compared with the conventional radial tire. If the difference is greater than 40 degrees, on the other hand, load durability is deteriorated, though the ply steer can be improved.

Though the embodiment described above deals with the belt reinforcing layer 5 of the two-layered structure consisting of the steel cord, it is also possible to use a two-layered structure consisting of a steel cord belt reinforcing layer and an aramid cord belt reinforcing layer referred to by its tradename "Kevlar", or to use ordinary conventional belt reinforcing layers such as one consisting of textile cord reinforcing layers for both layers. It is of course possible to use such belt reinforcing layers in which the end portions of the belt reinforcing layers are folded inward, or to use belt reinforcing layers having an additional textile cord reinforcing layer in addition to the above-mentioned two reinforcing layers.

Hereinafter, the present invention will be described more definitely with reference to Examples thereof.

EXAMPLE 1

Various radial tires, each having the belt reinforcing layer structure and carcass cord layer structure as shown in FIGS. 3 and 4, were produced while the angle difference ($\alpha_2-\alpha_1$) of the upper and lower carcass cord layers was kept constant at 30° and the average value $\beta$ of these angles was changed within the range of 66 to 114 degrees. The angles of the cord in the upper and lower belt reinforcing layers with respect to the tire circumferential direction were 20 degrees and 160 degrees, respectively. The tire size was 195/70HR14 and the rim size, $5\frac{1}{2}$–JJ×14. The ply steer was measured for each of these radial tires in accordance with the uniformity test method of car tires, JASO C607, with the results illustrated in FIG. 6.

Figure 6:
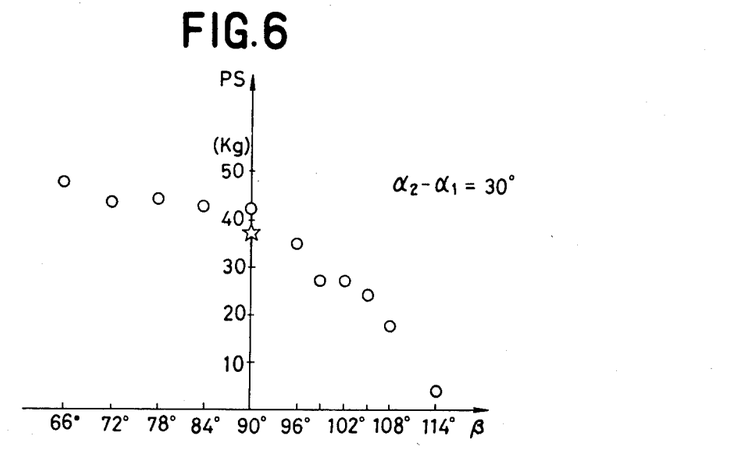
FIG. 6 is a diagram showing the relationship between the ply steer and an average angle value $\beta$.

In FIG. 6, the value plotted by an asterisk (☆) represents the value obtained by the conventional radial tire in which $\alpha_1=\alpha_2=90°$. It can be seen from this diagram that the ply steer PS was reduced in comparison with the conventional radial tire when the average angle value $\beta$ of the cords of the carcass cord layer was at least 96 degrees.

In other words, it can be understood that straight driving performance was improved.

Next, driving comfort was evaluated for each of these radial tires by measuring the impact force acting upon the tire in the longitudinal direction when riding over a protuberance, using an indoor drum tester consisting of a 2,500 mm diameter drum equipped with one semi-circular protuberance with a 10 mm radius on its circumference. The results are illustrated in FIG. 7.

Figure 7:
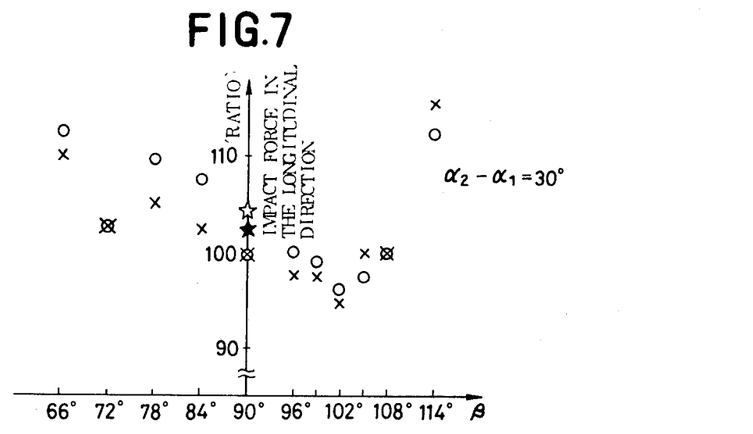
FIG. 7 is a diagram showing the relationship between the impact force in the longitudinal direction and the average angle value $\beta$.

FIG. 7 illustrates the impact force in the longitudinal direction acting upon each tire in terms of its ratio with the impact force in the longitudinal direction acting upon a radial tire with $\beta=90°$ being 100 as the reference. In this diagram, the values plotted by X represents the mean values when measured at driving speeds of 30, 40 and 50 km/hr at a 1.9 kg/cm² air pressure and a 520 kg load and those plotted by a ring mark (○) represent the mean values when measured at driving speeds of 50, 60 and 70 km/hr at the same air pressure and load. The values plotted by a black asterisk mark (★) represent the mean values of the conventional radial tire having $\alpha_1=\alpha_2=90°$ in the former test condition and those plotted by white asterisk mark (☆) represent the mean values of the conventional radial tire having $\alpha_1=\alpha_2=90°$ in the latter test condition.

As is obvious from FIG. 7, when the average value $\beta$ of the cord angles in the carcass cord layers was greater than 108 degrees, the impact force in the longitudinal direction became far greater than that of the conventional radial tire, thus deteriorating the driving comfort.

EXAMPLE 2

Various radial tires, each having the structure of the belt reinforcing layers and carcass cord layers as shown in FIGS. 3 and 4, were produced while the average value $\beta$ of the cord angles of the upper and lower carcass cord layers was kept constant at 102° and the angle difference ($\alpha_2-\alpha_1$) was changed within the range of $-50°$ to $+50°$. The angles of the cords in the upper and lower layers in the belt reinforcing layers with respect to the tire circumferential direction were 20 degrees and 160 degrees, respectively. The tire size was 195/70HR14 and the rim size was $5\frac{1}{2}$–JJ×14. The ply steer PS was measured for each of these radial tires in accordance with the uniformity test method for car tires, JASO C607 with the results shown in FIG. 8.

Figure 8:
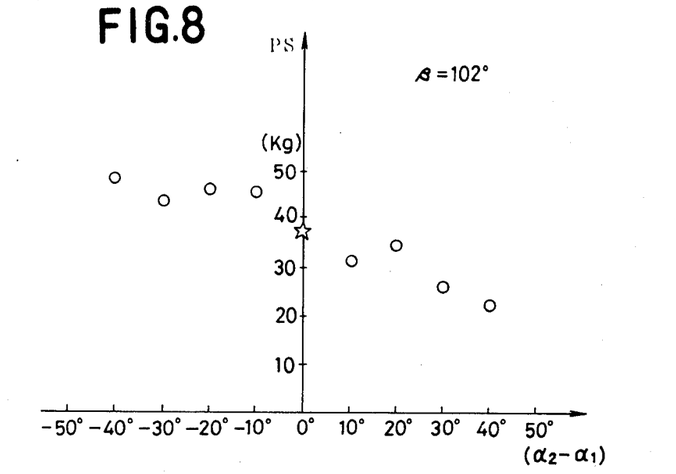
FIG. 8 is a diagram showing the relationship between the ply steer and the angle difference $(\alpha_2 - \alpha_1)$.

In FIG. 8, the value plotted by the asterisk (☆) represents the value obtained by the conventional radial tire having $\alpha_1=\alpha_2=90°$. As is obvious from this diagram, the ply steer was reduced in comparison with the conventional radial tire when the cord angle difference ($\alpha_2-\alpha_1$) of the carcass cord layers was at least 10 degrees, thus improving the straight driving performance.

On the other hand, load durability was measured for each of these radial tires using an indoor drum tester consisting of a drum of a 1707 mm diameter. Each tire was driven at an air pressure of 2.1 kg/cm², a speed of 80 km/hr and an initial load of 525 kg while increasing the load by 100 kg every five hours until it was broken. The load at which each tire was broken was plotted in FIG. 9.

Figure 9:
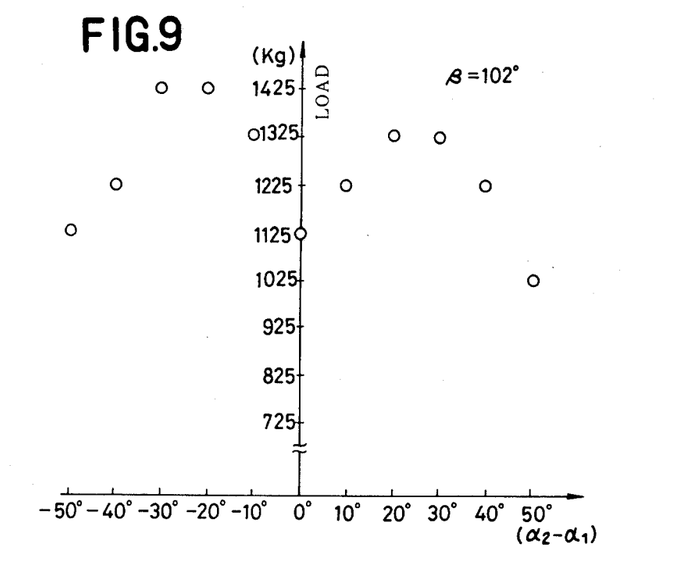
FIG. 9 is a diagram showing the relationship between the load and the angle difference $(\alpha_2 - \alpha_1)$.

As is obvious from FIG. 9, load durability dropped drastically when the cord angle difference ($\alpha_2-\alpha_1$) became greater than 40 degrees.

EXAMPLE 3

The cornering force when a slip angle of 2 degrees was applied was measured for each of the radial tires of Example 1 at an air pressure of 1.9 kg/cm² and a load of 520 kg, using an indoor drum tester consisting of a 2,500 mm diameter drum. The value was divided by 2 to obtain the cornering power. Each of the measured values is expressed by a ratio with $\beta=90°$ being 100. The results are shown in FIG. 10.

Figure 10:
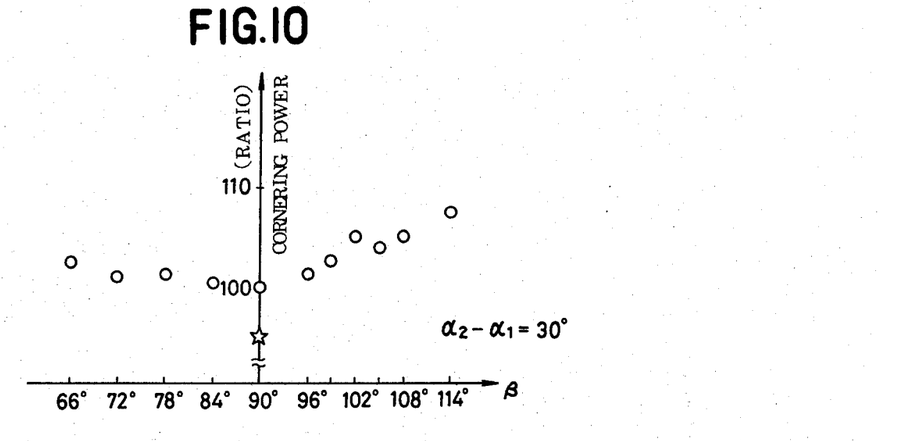
FIG. 10 is a diagram showing the relationship between the cornering power and the angle difference $(\alpha_2 - \alpha_1)$.

In FIG. 10, the values plotted by the asterisk (☆) represent those obtained from conventional radial tires having $\alpha_1=\alpha_2=90°$. As is obvious from FIG. 10, each of the radial tires in accordance with the present invention, in which $\beta$ was from 96 to 108 degrees, has greater cornering power and better maneuverability than the conventional radial tires.

A high speed durability test was carried out for each of these radial tires using an indoor drum tester consisting of a 1,707 mm diameter drum. Each tire was driven at an air pressure of 2.1 kg/cm², a load of 550 kg and an initial speed of 81 km/hr while increasing the speed by 8 km/hr every 30 minutes until it broke. The speed at which the tire broke is plotted in FIG. 11.

Figure 11:
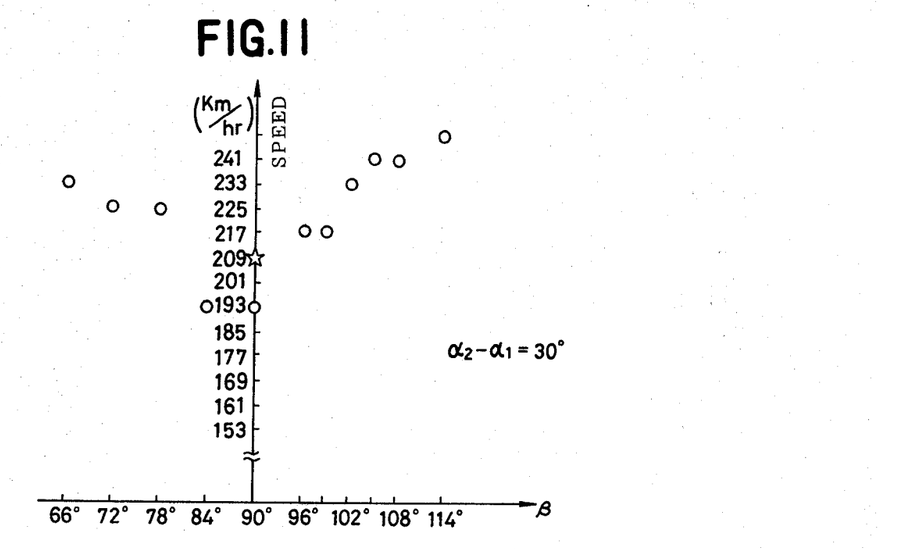
FIG. 11 is a diagram showing the relationship between the travelling speed and the average angle value $\beta$.

The values indicated by the asterisk (☆) in FIG. 11 represent those obtained from the conventional radial tires having $\alpha_1=\alpha_2=90°$. As is obvious from FIG. 11, the radial tires of the present invention, in which $\beta=96°$ to 108°, had a better high speed durability than the conventional radial tires.

As described in the foregoing, in a pneumatic tire having the construction in which at least two belt reinforcing laminate layers, one having the reinforcing cord disposed at an angle of 15 to 30 degrees with respect to the tire circumferential direction and the other having the reinforcing cord disposed at an angle of 150 to 165 degrees with respect to the tire circumferential direction, are disposed between a tread and a carcass cord layer, the pneumatic tire in accordance with the present invention has the construction such that the carcass cord layer consists of a laminate of upper and lower carcass cord layers; the average angle value, $\frac{1}{2}(\alpha_1+\alpha_2)$ of the angle $\alpha_2$ of the reinforcing cord of the carcass cord layer on the contact side with respect to the belt reinforcing layers and the angle $\alpha_1$ of the reinforcing cord of the carcass cord layer below the former is from 96 to 108 degrees and the difference of these angles ($\alpha_2-\alpha_1$) is from 10 to 40 degrees, wherein the angles $\alpha_1$ and $\alpha_2$ are measured from the side in which the reinforcing cord of the belt reinforcing layer on the contact side with the carcass cord layer relative to the tire circumferential direction describes an acute angle. This arrangement reduces the ply steer resulting from the belt reinforcing layer and improves the straight driving performance and the comfort to drive in comparison to the conventional radial tire. Moreover, the maneuverability as well as high speed durability can also be improved as compared with the conventional radial tire.

What is claimed is:

1. In a pneumatic tire comprising a tread, a carcass cord layer and at least two belt reinforcing layers disposed between said tread and said carcass cord layer, the reinforcing cord of one of said belt reinforcing layers having an angle of 15 to 30 degrees with respect to the tire circumferential direction and the reinforcing cord of the other of said belt reinforcing layers having an angle of 150 to 165 degrees with respect to the tire circumferential direction, the improvement wherein said carcass cord layer consists of a laminate of upper and lower carcass cord layers, and the average value $\frac{1}{2}(\alpha_1 + \alpha_2)$ of the angle $\alpha_2$ of the reinforcing cord of said upper carcass cord layer adjacent said belt reinforcing layers with respect to the tire circumferential direction and the angle $\alpha_1$ of the reinforcing cord of said lower carcass cord layer with respect to the tire circumferential direction is from 96 to 108 degrees and their difference $(\alpha_2 - \alpha_1)$ is from 10 to 40 degrees, with the proviso that the angles $\alpha_1$ and $\alpha_2$ are measured from the side in which the reinforcing cord of said belt reinforcing layer adjacent said upper carcass cord layer with respect to the tire circumferential direction describes an acute angle.

2. The pneumatic tire as claimed in claim 1, wherein said belt reinforcing layer is a two-layered steel belt reinforcing layer.

3. The pneumatic tire as claimed in claim 1, wherein said belt reinforcing layer has a two-layered structure, one of said layers is a steel cord belt reinforcing layer and is disposed adjacent to said upper carcass cord layer and the other is an aramid cord belt reinforcing layer and is disposed on said steel belt reinforcing layer.

4. The pneumatic tire as claimed in claim 3, wherein both ends of said aramid cord reinforcing layers are folded towards the center of the tire circumferential direction.

* * * * *